United States Patent
Kubo et al.

(10) Patent No.: US 6,682,784 B2
(45) Date of Patent: Jan. 27, 2004

(54) LIQUID CRYSTAL COMPOSITIONS AND LIQUID CRYSTAL DISPLAY DEVICES

(75) Inventors: Yasuhiro Kubo, Chiba (JP); Kanetsugu Terashima, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 35 days.

(21) Appl. No.: 10/101,114

(22) Filed: Mar. 20, 2002

(65) Prior Publication Data

US 2003/0001138 A1 Jan. 2, 2003

(30) Foreign Application Priority Data

Mar. 23, 2001 (JP) ........................... 2001-085652

(51) Int. Cl.$^7$ .................. C09K 19/30; C09K 19/20; C09K 19/12
(52) U.S. Cl. ............... 428/1.1; 252/299.63; 252/299.66; 252/299.67
(58) Field of Search ............... 252/299.01, 299.63, 252/299.66, 299.67; 428/1.1

(56) References Cited

U.S. PATENT DOCUMENTS

| | | | |
|---|---|---|---|
| 5,167,860 A | 12/1992 | Sawada et al. | 252/299.63 |
| 5,308,543 A | 5/1994 | Sasaki et al. | 252/299.63 |
| 5,330,679 A | 7/1994 | Sasaki et al. | 252/299.63 |
| 5,389,289 A | 2/1995 | Rieger et al. | 252/299.01 |
| 5,616,284 A * | 4/1997 | Hittich et al. | 252/299.63 |
| 5,746,941 A * | 5/1998 | Rieger et al. | 252/299.63 |
| 6,572,938 B2 * | 6/2003 | Yanai et al. | 428/1.1 |

OTHER PUBLICATIONS

Abstract of JP 3086228 (Sep. 2000).
Abstract of JP 4505477 (Sep. 1992).
Abstract of JP 5105876 (Apr. 1993).

* cited by examiner

Primary Examiner—Shean C. Wu
(74) Attorney, Agent, or Firm—Wenderoth, Lind & Ponack, L.L.P.

(57) ABSTRACT

Liquid crystal compositions having board nematic phase range, low viscosity, low threshold voltage and large pre-tilt angle, while meeting the general properties required for AM-LCD. The compositions contain at least one of the compounds of the formulas (I-1) to (I-3), at least one of the compounds of the formulas (II-1) to (II-4), at least one of the compounds of the formulas (III-1) and (III-2), at least one of the compounds of the formulas (IV-1) to (IV-3), and optionally at least one of the compounds of the formulas (V-1) and (V-2), as described in the specification.

18 Claims, No Drawings

LIQUID CRYSTAL COMPOSITIONS AND LIQUID CRYSTAL DISPLAY DEVICES

TECHNICAL FIELD

This invention relates to nematic liquid crystal compositions comprising a liquid crystalline compound as a main component. More particularly, the invention relates to liquid crystal compositions for an active-matrix liquid crystal display device and liquid crystal display devices using these liquid crystal compositions. For convenience, a liquid crystalline compound may be abbreviated hereafter to a compound, and a liquid crystal composition to a composition.

BACKGROUND ART

Liquid crystal display devices (LCD) easily permit low power consumption and a lightweight, planar, flat surface, as compared with CRT (cathode-ray tube mode display). Therefore, a variety of LCD have been put to practical use, including a twisted nematic (TN) mode, a super twisted nematic (STN) mode, a thin-film transistor (TFT) mode and the like. Among them, active-matrix LCD (AM-LCD) such as TFT or the like has been advanced in the high definition and high view angle, attracting the attention as the favorite of flat display panels.

The following general properties (1) to (4) are required for the liquid crystal compositions for AM-LCD.

(1) The specific resistance and voltage holding ratio are high for achieving a better contrast of LCD.
(2) The temperature range of nematic phase is broad for enabling the outdoor use of LCD. That is, the upper limit of the temperature exhibiting nematic phase is high, while the lower limit is low.
(3) The threshold voltage is low for reducing a consumption power of LCD.
(4) The viscosity is low for increasing the response rate of LCD.

Japanese Patent No. 3,086,228, WO91/13947 (Japanese Patent Hyo Hei 4-505477 (JP-A-4-505477)), Japanese Patent Kokai Hei 5-105876 (JP-A-5-105876), etc. disclose the compositions usable in AM-LCD. These compositions, however, show the tendency that the nematic phase range is narrow, the viscosity is high and the threshold voltage is high, and therefore they are not suitable for use in AM-LCD. The components for the composition have been investigated in accordance with the intended use, but more improvement is always required.

DISCLOSURE OF THE INVENTION

An object of the invention is to provide a liquid crystal composition, especially having broad nematic phase range, low viscosity, low threshold voltage and large pre-tilt angle, while meeting the general properties required for AM-LCD.

Another object of the invention is to provide a liquid crystal display device composed of the liquid crystal composition.

We have studied various liquid crystal compositions comprising liquid crystalline compounds in an effort to solve the above-mentioned problems, and as a result the above objects could be accomplished by the present invention as mentioned below.

In a first aspect, the present invention relates to a liquid crystal composition which comprises Component I comprising at least one compound selected from the compounds of the formulas (I-1) to (I-3), Component II comprising at least one compound selected from the compounds of the formulas (II-1) to (II-4), Component III comprising at least one compound selected from the compounds of the formulas (III-1) and (III-2), and Component IV comprising at least one compound selected from the compounds of the formulas (IV-1) to (IV-3).

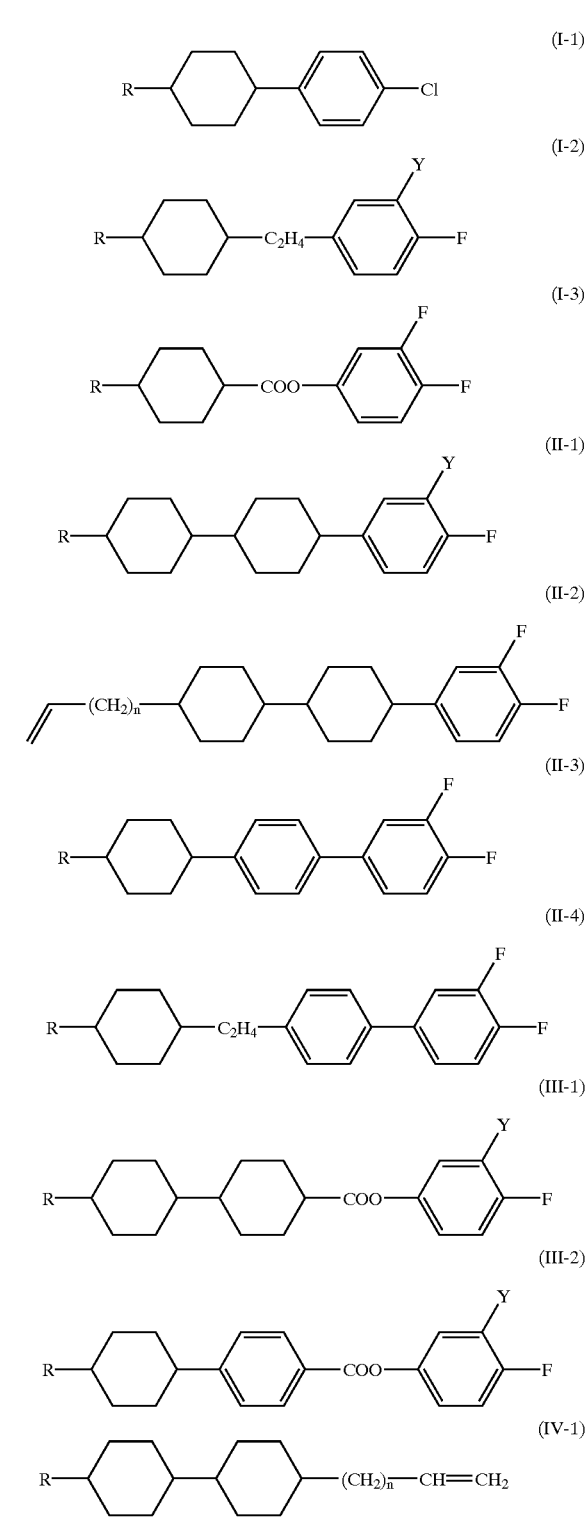

-continued

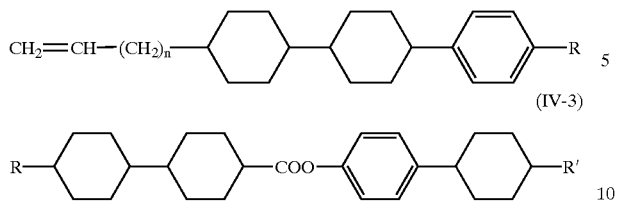

wherein R and R' each independently represent an alkyl group of 2 to 7 carbon atoms, Y independently represents H or F, and n represents an integer of 0 to 4.

0.1 to 3% by weight of an optically active material may be added to the composition, based on the total weight thereof.

In an embodiment of the first aspect, Component I comprises the compound of the formula (I-1), the compound of the formula (I-2), or the compound of the formula (I-3).

In another embodiment of the first aspect, the content of Component I is 5 to 30% by weight, the content of Component II is 30 to 70% by weight, the content of Component III is 5 to 45% by weight, and the content of Component IV is 5 to 30% by weight, based on the total weight of the composition.

In a second aspect, the present invention relates to a liquid crystal composition which consists essentially of four components of Component I comprising at least one compound selected from the compounds of the formulas (I-1) to (I-3), Component II comprising at least one compound selected from the compounds of the formulas (II-1) to (II-4), Component III comprising at least one compound selected from the compounds of the formulas (III-1) and (III-2), and Component IV comprising at least one compound selected from the compounds of the formulas (IV-1) to (IV-3),

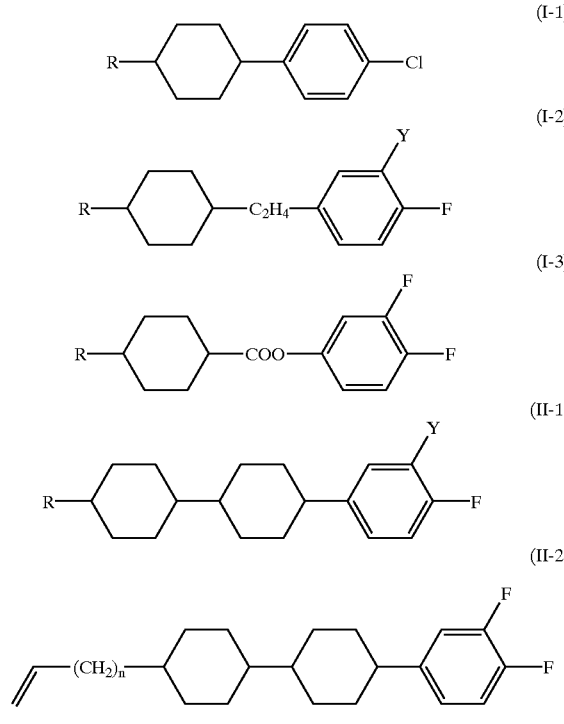

-continued

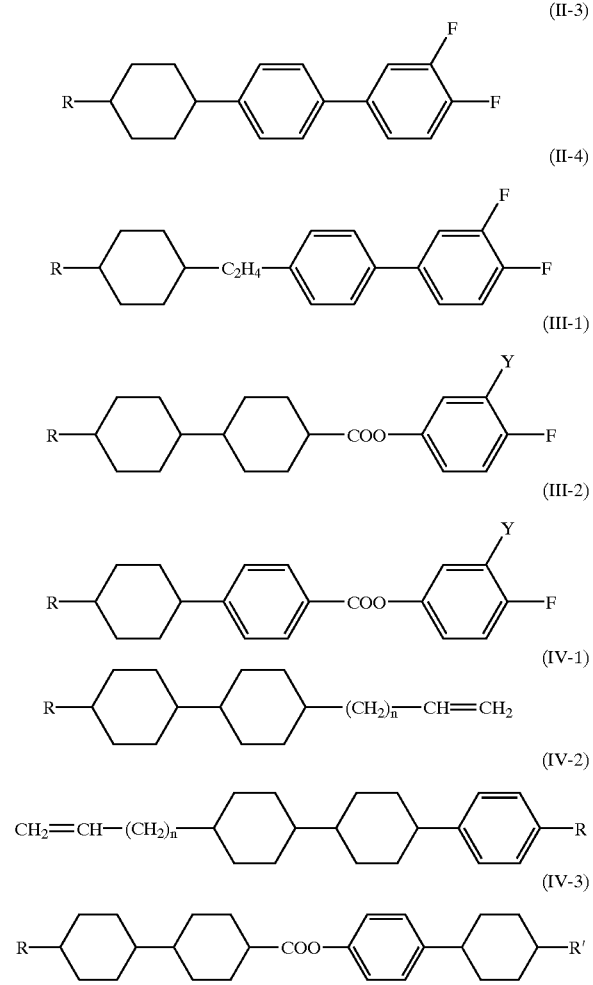

in which R and R' each independently represent an alkyl group of 2 to 7 carbon atoms, Y independently represents H or F, and n represents an integer of 0 to 4.

This composition may contain impurities such as by-products produced during the synthesis of each compound. So far as the objects of the present invention are achieved, several percent of liquid crystalline compounds may be added to the composition. In addition to the liquid crystalline compounds, small amounts of additives may be added to the composition, if necessary.

0.1 to 3% by weight of an optically active material may be added to the composition, based on the total weight thereof.

In an embodiment of the third aspect, the content of Component I is 5 to 30% by weight, the content of Component II is 30 to 70% by weight, the content of Component III is 5 to 45% by weight, and the content of Component IV is 5 to 30% by weight, based on the total weight of the composition.

In a third aspect, the present invention relates to a liquid crystal composition of the first aspect, which further contains Component V comprising at least one compound selected from the compounds of the formulas (V-1) and (V-2), (V-1)

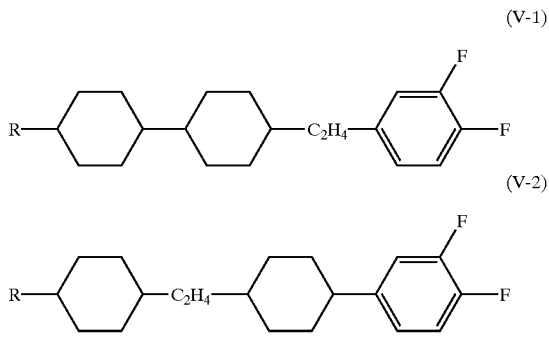

(V-2)

wherein R independently represents an alkyl group of 2 to 7 carbon atoms.

0.1 to 3% by weight of an optically active material may be added to the composition, based on the total weight thereof.

In an embodiment of the second aspect, the content of Component I is 5 to 30% by weight, the content of Component II is 30 to 70% by weight, the content of Component III is 5 to 45% by weight, the content of Component IV is 5 to 30% by weight, and the content of Component V is 5 to 25% by weight, based on the total weight of the composition.

In a fourth aspect, the present invention relates to a liquid crystal display device in which each of the liquid crystal compositions of the above-mentioned aspects is used.

In an embodiment of the fourth aspect, the liquid crystal composition used is that of the first aspect.

In another embodiment, the liquid crystal composition used is that of the second aspect.

In a further embodiment, the liquid crystal composition used is that of the third aspect.

EMBODIMENTS FOR CARRYING OUT THE INVENTION

Component I in the composition of the invention is the compounds of the formulas (I-1) to (I-3). The formula (I-2) is specified as follows:

(I-2-1)

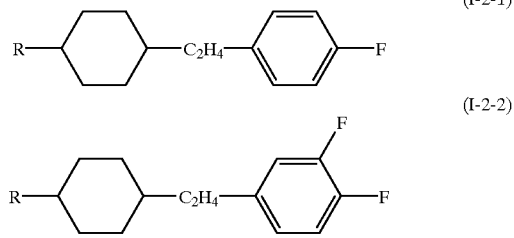

(I-2-2)

Component I has an optical anisotropy (Δn) of about 0.02 to 0.07, a clearing point (Tc) of about −30 to 20° C. and a dielectric anisotropy (Δ ε) of 3 to 8, and shows excellent thermal and chemical stabilities and excellent solubility. Component I reduces the lower limit of nematic phase range of the composition, while lowering the viscosity. However, the composition comprising Component I only tends to have a reduced pre-tilt angle, in addition to an exceedingly lowered upper limit of nematic phase range.

Component II is the compounds of the formulas (II-1) to (II-4). The formula (II-1) is specified as follows:

(II-1-1)

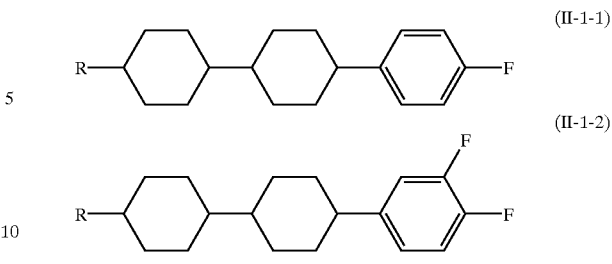

(II-1-2)

Component II has Tc of about 50 to 120° C., Δ ε of about 5 to 10 and Δn of about 0.07 to 0.14, and shows excellent thermal and chemical stabilities and excellent solubility. Component II increases the upper limit of nematic phase range of the composition, while reducing the threshold voltage. However, the composition comprising Component II only tends to have an increased lower limit of nematic phase range.

Component III is the compounds of the formulas (III-1) and (III-2). The formulas (III-1) and (III-2) are specified as follows:

(III-1-1)

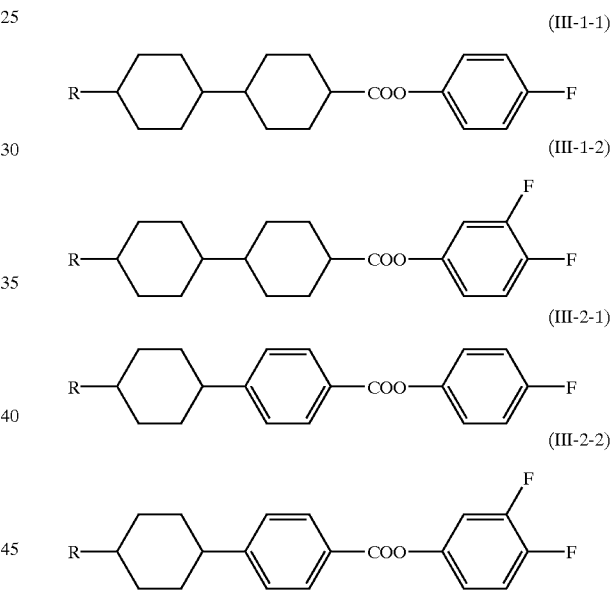

(III-1-2)

(III-2-1)

(III-2-2)

Component III has Tc of about 100 to 160° C., Δ ε of about 4 to 10 and Δn of about 0.07 to 0.10, and shows excellent thermal and chemical stabilities and excellent solubility. Component III reduces the threshold voltage of the composition. However, the composition comprising Component III only tends to have an increased viscosity, in addition to the increased lower limit of nematic phase range.

Component IV is the compounds of the formulas (IV-1) to (IV-3). Component IV has Tc of about 60 to 230° C., Δ ε of approximately 0 and Δn of about 0.03 to 0.11, and shows excellent thermal and chemical stabilities and excellent solubility. Component IV increases the pre-tilt angle of the composition to broaden the nematic phase range. However, the composition comprising only Component IV only tends to have an increased threshold voltage.

Combination of Components I, II, III and IV can prepare liquid crystal compositions for AM-LCD which have broad nematic phase range, low viscosity, low threshold voltage and large pre-tilt angle.

The content of Component I is preferably 5 to 30% by weight, more preferably 5 to 25% by weight, based on the total weight of the composition. Less than 5% by weight may increase the lower limit of nematic phase range of the composition. More than 30% by weight may reduce the upper limit of the nematic phase range.

The content of Component II is preferably 30 to 70% by weight, more preferably 35 to 65% by weight, based on the total weight of the composition. Less than 30% by weight may increase the threshold voltage. More than 70% by weight may increase the lower limit of nematic phase range.

The content of Component III is preferably 5 to 45% by weight, more preferably 5 to 40% by weight, based on the total weight of the composition. Less than 5% by weight may increase the threshold voltage. More than 45% by weight may increase the lower limit of nematic phase range.

The content of Component IV is preferably 5 to 30% by weight, more preferably 5 to 25% by weight, based on the total weight of the composition. Less than 5% by weight may increase the threshold voltage. More than 30% by weight may increase the lower limit of nematic phase range.

The content of Component V is preferably 5 to 25% by weight, based on the total weight of the composition.

The liquid crystal display device of the invention has preferably the use temperature range of from at least 70° C. to −20° C. If this range is narrower, the display of device may be difficult outdoors. For this reason, it is desirable that the upper limit temperature exhibiting the nematic phase of the composition is 70° C. or higher and the lower limit temperature is −20° C. or lower.

The compounds of the formulas (I-1) to (IV-3) can be synthesized by the methods disclosed in the following Japanese patent publications. The method for the synthesis of the compounds of the formula (I-1) is disclosed in Japanese Patent Kokai Sho 57-2226 (JP-A-57-2226). As an example of the compounds of the formula (I-2), the method for the synthesis of the compounds of the formula (I-2-1) is disclosed in Japanese Patent Kokai Sho 59-10533 (JP-A-59-10533). The method for the synthesis of the compounds of the formula (I-3) is disclosed in Japanese Patent Kokoku Sho 61-21937 (JP-B-61-21937). As an example of the compounds of the formula (II-1), the method for the synthesis of the compounds of the formula (II-1-1) is disclosed in Japanese Patent Kokai Sho 57-64626 (JP-A-57-64626). The method for the synthesis of the compounds of the formula (II-2) is disclosed in Japanese Patent No. 2674853. The method for the synthesis of the compounds of the formula (II-3) is disclosed in Japanese Patent Kokai Sho 57-154135 (JP-A-57-154135). The method for the synthesis of the compounds of the formula (II-4) is disclosed in Japanese Patent Kokai Sho 61-282328 (JP-A-61-282328). As an example of the compounds of the formula (III-1), the method for the synthesis of the compounds of the formula (III-1-1) is disclosed in Japanese Patent Kokoku Sho 61-26979 (JP-B-61-26979). As an example of the compounds of the formula (III-2), the method for the synthesis of the compounds of the formula (III-2-1) is disclosed in Japanese Patent Kokoku Sho 60-59893 (JP-B-60-59893). The method for the synthesis of the compounds of the formula (IV-1) is disclosed in Japanese Patent Kokoku Hei 4-30382 (JP-B-4-30382). The method for the synthesis of the compounds of the formula (IV-2) is disclosed in Japanese Patent Kokoku Hei 4-30382 (JP-B-4-30382). The method for the synthesis of the compounds of the formula (IV-3) is disclosed in Japanese Patent Kokai Sho 57-21083 (JP-A-57-21083). The compounds of the formulas (V-1) and (V-2) can be readily synthesized by a person skilled in the art in accordance with known methods for the synthesis. As mentioned above, the compounds for Components I to V can be synthesized in view of the prior art references. The compounds for each component are mixed, heated and dissolved for each other to prepare a composition.

In any case, small amounts of additives may be added to the compositions of the present invention, if necessary. For the purpose of inducing a helical structure of liquid crystalline molecule to provide a twist angle, a chiral dopant (optically active compound) such as CM-33 and cholesteric nonanoate (CN) or the like may be added to the compositions. This is because a twist angle of about 90 degrees and 180 to 260 degrees is required for TN and STN modes, respectively.

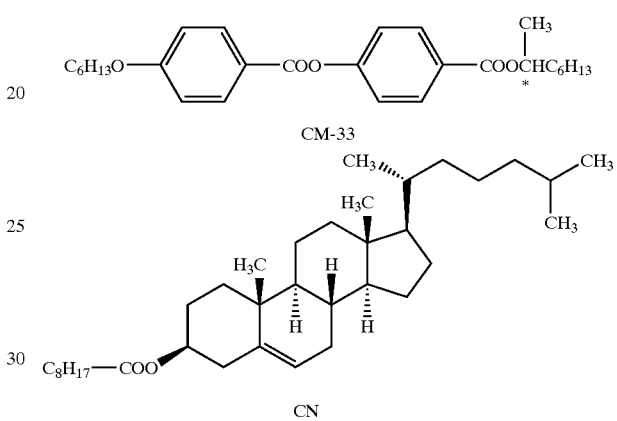

The compositions of the invention can also be used in OCB (Optically Controlled Bend) mode and IPS (In Plain Switching) mode. In these cases, no chiral dopant is added usually. Further, the compositions of the invention can be used for guest-host mode, by adding a dichronic dye such as merocyanines, styryls, azo, azomethines, azoxy, quinophthalones, anthraquinones or tetrazines.

The liquid crystal compositions of the invention can also be used in a polymer dispersed liquid crystal display device, and for a birefringence controlled mode and a dynamic scattering mode.

EXAMPLES

The invention is further illustrated by the following non-limiting Examples. In the Comparative Examples and the Examples, the components of the composition with their respective weight % are first indicated, and then the physical properties. The compounds used are designated in accordance with the abbreviated notation as shown in Table 1. Tc stands for clearing point, TL stands for lower limit of nematic phase range, Δn stands for optical anisotropy at 25° C., Δε stands for dielectric anisotropy at 25° C., η stands for viscosity at 20° C., and θ 0 stands for pre-tilt angle at 25° C. TL was judged from the liquid crystal phase after the composition was kept at the temperatures of 0° C., −10° C., −20° C., −30° C. and −40° C. for 30 days, respectively. Under the condition of −20° C. for 30 days, the composition remains in nematic phase. When the composition was crystallized under the condition of −30° C. for 30 days, TL of the composition was expressed by <−20° C. Δn was measured with a light source lump having a wavelength at 589 nm. In the measurement of Vth, a cell having a cell thickness of about 9 μm and a twist angle of 80 degrees was used, and a rectangular wave having a frequency of 32 Hz was applied in a normally white mode. Vth refers to a voltage applied when the transmittance of light passing through the cell is 90%. The pre-tilt angle was measured by a crystal rotation method. In this case, an anti-parallel cell covered with an alignment film manufactured by Chisso Corporation was used.

TABLE 1

Method for Description of Compounds Using Symbols
$R—(A_1)—Z_1—\ldots—Z_n—(A_n)—X$

| 1) Left Terminal Group R— | Symbol |
|---|---|
| $C_nH_{2n+1}—$ | n- |
| $C_nH_{2n+1}O—$ | nO— |
| $C_nH_{2n+1}OC_mH_{2m+1}—$ | nOm- |
| $CH_2=CH—$ | V— |
| $CH_2=CHC_nH_{2n}—$ | Vn- |
| $C_nH_{2n+1}CH=CHC_mH_{2m}—$ | nVm- |
| $C_nH_{2n+1}CH=CHC_mH_{2m}CH=CHC_kH_{2k}—$ | nVmVk- |
| $CF_2=CH—$ | VFF— |
| $CF_2=CHC_nH_{2n}—$ | VFFn- |

| 2) Ring Structure —An— | Symbol |
|---|---|
| 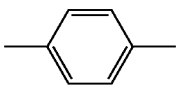 | B |
| 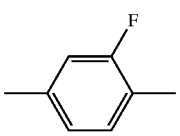 | B(F) |
| 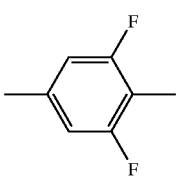 | B(F,F) |
| 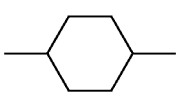 | H |
| 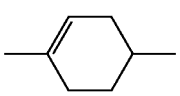 | Ch |
| 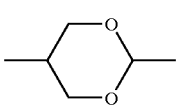 | G |
| 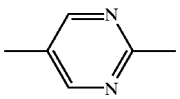 | Py |

| 3) Bonding Group —Zn— | Symbol |
|---|---|
| $—C_2H_4—$ | 2 |
| $—C_4H_8—$ | 4 |
| —COO— | E |
| —C≡C— | T |
| —CH=CH— | V |

| 4) Right Terminal Group —X | Symbol |
|---|---|
| —F | —F |
| —Cl | —CL |
| —CN | —C |
| $—CF_3$ | —CF3 |

TABLE 1-continued

| | |
|---|---|
| —OCF$_3$ | —OCF3 |
| —OCF$_2$H | —OCF2H |
| —C$_n$H$_{2n+1}$ | -n |
| —OC$_n$H$_{2n+1}$ | —On |
| —COOCH$_3$ | -EMe |
| —C$_n$H$_{2n}$CH=CH$_2$ | -nV |
| —C$_m$H$_{2m}$CH=CHC$_n$H$_{2n+1}$ | -mVn |
| —CH=CF$_2$ | —VFF |
| —C$_n$H$_{2n}$CH=CF$_2$ | -nVFF |

5) Examples of Description

Example 1. 3-H2BB(F)—F

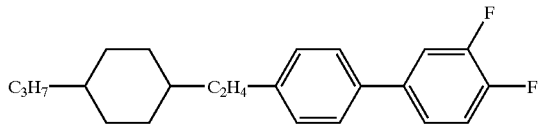

Example 2. 5-HH—V

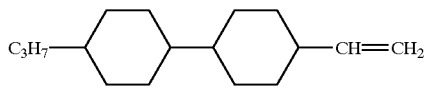

Example 3. 3-HHEBH-5

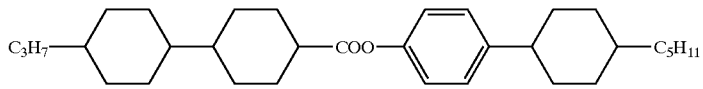

Comparative Example 1

The composition illustrated in Example 1 of Japanese Patent No. 3,086,228 was prepared and the physical properties were measured. It was found that the lower limit of nematic phase range was high and the viscosity was high.

| | |
|---|---|
| 2-H2HB(F)—F | 16.5% |
| 3-H2HB(F)—F | 6.3% |
| 4-H2HB(F)—F | 7.2% |
| 2-HHB(F)—F | 16.7% |
| 4-HHB(F)—F | 16.7% |
| 5-HHB(F)—F | 16.6% |
| 5-HEB—F | 7.5% |
| 7-HEB—F | 7.5% |
| 3-HHEB—F | 2.5% |
| 5-HHEB—F | 2.5% |
| Tc = 90.7° C. | |
| TL < −10° C. | |
| Δn = 0.073 | |
| η = 26.7 mPa · s | |
| Vth = 1.90 V | |
| θ0 = 4.6° | |

Comparative Example 2

The composition illustrated in Example 5 of WO91/13947 (Japanese Patent Hyo Hei 4-505477 (JP-A-4-505477)) was prepared and the physical properties were measured. It was found that the upper limit of nematic phase range was low and the pre-tilt angle was small.

| | |
|---|---|
| 5-HB—F | 11.0% |
| 6-HB—F | 10.0% |
| 7-HB—F | 16.0% |
| 2-HHB—OCF3 | 9.0% |
| 3-HHB—OCF3 | 12.0% |
| 4-HHB—OCF3 | 7.0% |
| 5-HHB—OCF3 | 12.0% |
| 2-HBB(F)—F | 10.0% |
| 3-HBB(F)—F | 13.0% |
| Tc = 59.7° C. | |
| TL < −20° C. | |
| Δn = 0.084 | |
| η = 14.3 mPa · s | |
| Vth = 2.04 V | |
| θ0 = 4.2° | |

Comparative Example 3

The composition illustrated in Example 1 of Japanese Patent Kokai No. Hei 5-105876 was prepared and the physical properties were measured. It was found that the viscosity was high and the pre-tilt angle was small.

| | |
|---|---|
| 5-HB—F | 5.0% |
| 7-HB—F | 5.0% |
| 2-HHB—OCF3 | 7.0% |
| 3-HHB—OCF3 | 7.0% |
| 4-HHB—OCF3 | 7.0% |
| 5-HHB—OCF3 | 8.0% |
| 3-HH2B(F)—F | 8.0% |
| 5-HH2B(F)—F | 8.0% |
| 3-HBB(F, F)—F | 14.0% |

-continued

| | |
|---|---|
| 5-HBB(F, F)—F | 13.0% |
| 3-HHB(F, F)—F | 9.0% |
| 5-HHB(F, F)—F | 9.0% |
| Tc = 84.8° C. | |
| TL < −20° C. | |
| Δn = 0.092 | |
| η = 21.6 mPa · s | |
| Vth = 1.84 V | |
| θ0 = 4.7° | |

Example 1

| | |
|---|---|
| 3-H2BB(F)—F | 6.3% |
| 5-H2BB(F)—F | 7.2% |
| 2-HHB(F)—F | 16.7% |
| 4-HHB(F)—F | 16.7% |
| 5-HHB(F)—F | 16.6% |
| 5-HEB(F)—F | 7.5% |
| 7-HEB(F)—F | 7.5% |
| 3-HHEB—F | 2.5% |
| 5-HHEB—F | 2.5% |
| V-HHB-1 | 16.5% |
| Tc = 95.7° C. | |
| TL < −20° C. | |
| Δn = 0.079 | |
| η = 25.1 mPa · s | |
| Vth = 1.71 V | |
| θ0 = 5.4° | |

Example 2

| | |
|---|---|
| 5-HB—CL | 11.0% |
| 5-HEB(F)—F | 10.0% |
| 5-HH—V | 16.0% |
| 3-HHEB(F)—F | 9.0% |
| V-HHB(F)—F | 12.0% |
| 4-HHB—F | 7.0% |
| 5-HHB—F | 12.0% |
| 2-HBB(F)—F | 10.0% |
| 3-HBB(F)—F | 13.0% |
| Tc = 67.3° C. | |
| TL < −20° C. | |
| Δn = 0.092 | |
| η = 19.5 mPa · s | |
| Vth = 1.86 V | |
| θ0 = 5.7° C. | |

Example 3

| | |
|---|---|
| 5-HB—CL | 5.0% |
| 7-HB—CL | 5.0% |
| V-HHB(F)—F | 7.0% |
| V2-HHB(F)—F | 7.0% |
| V-HHB-1 | 7.0% |
| V2-HHB-1 | 8.0% |
| 3-HHEB(F)—F | 8.0% |
| 5-H2B(F)—F | 8.0% |
| 3-HBB(F)—F | 14.0% |
| 5-HBB(F)—F | 13.0% |
| 3-HHB(F)—F | 9.0% |
| 5-HHB(F)—F | 9.0% |
| Tc = 92.6° C. | |
| TL < −20° C. | |
| Δn = 0.098 | |
| η = 18.4 mPa · s | |
| Vth = 1.80 V | |
| θ0 = 6.4° | |

Example 4

| | |
|---|---|
| 5-HB—CL | 20.0% |
| 5-HH—V | 16.0% |
| 3-HHEB(F)—F | 15.0% |
| 5-HHEB(F)—F | 10.0% |
| 2-HHB(F)—F | 11.0% |
| 3-HHB(F)—F | 11.0% |
| 5-HHB(F)—F | 11.0% |
| V2-HHB(F)—F | 6.0% |
| Tc = 83.7° C. | |
| TL < −20° C. | |
| Δn = 0.075 | |
| η = 15.4 mPa · s | |
| Vth = 2.40 V | |
| θ0 = 5.6° | |

Example 5

| | |
|---|---|
| 5-HB—CL | 5.0% |
| 5-HH—V | 6.0% |
| 5-HEB(F)—F | 10.0% |
| 3-HHEB(F)—F | 18.0% |
| 3-HBEB(F)—F | 10.0% |
| 3-HHEB—F | 4.0% |
| 2-HHB(F)—F | 9.0% |
| 3-HHB(F)—F | 9.0% |
| 5-HHB(F)—F | 9.0% |
| 2-HBB(F)—F | 8.0% |
| 3-HBB(F)—F | 4.0% |
| 5-HBB(F)—F | 8.0% |
| Tc = 91.7° C. | |
| TL < −30° C. | |
| Δn = 0.093 | |
| η = 15.4 mPa · s | |
| Vth = 2.40 V | |
| θ0 = 5.3° | |

Example 6

| | |
|---|---|
| 5-HB—CL | 12.0% |
| 5-HH—V | 15.0% |
| 5-H2B(F)—F | 4.0% |
| 3-HHEB(F)—F | 20.0% |
| 5-HHEB(F)—F | 5.0% |
| V-HHB-1 | 7.0% |
| 2-HHB(F)—F | 9.0% |
| 3-HHB(F)—F | 9.0% |
| 5-HHB(F)—F | 9.0% |
| V-HHB(F)—F | 10.0% |
| Tc = 95.3° C. | |
| TL < −20° C. | |
| Δn = 0.078 | |
| η = 17.3 mPa · s | |
| Vth = 2.45 V | |
| θ0 = 5.9° | |

Example 7

| | |
|---|---|
| 5-HB—CL | 10.0% |
| 4-HH—V | 5.0% |
| 5-H2B—F | 10.0% |
| 3-HHEB(F)—F | 18.0% |
| 3-HBEB(F)—F | 5.0% |
| 5-HBEB(F)—F | 5.0% |
| 2-HHB(F)—F | 9.0% |
| 3-HHB(F)—F | 9.0% |
| 5-HHB(F)—F | 9.0% |
| 2-HBB(F)—F | 8.0% |
| 3-HBB(F)—F | 4.0% |
| 3-H2BB(F)—F | 8.0% |
| Tc = 81.6° C. | |
| TL < −20° C. | |
| Δn = 0.092 | |
| η = 19.4 mPa · s | |
| Vth = 1.95 V | |
| θ0 = 5.6° | |

Example 8

| | |
|---|---|
| 5-HB—CL | 10.0% |
| 7-HB—CL | 4.0% |
| 5-HH—V | 4.0% |
| 3-HHEB—F | 4.0% |
| 5-HHEB—F | 4.0% |
| 3-HBEB(F)—F | 6.0% |
| 5-HBEB(F)—F | 4.0% |
| 2-HHB(F)—F | 13.0% |
| 3-HHB(F)—F | 13.0% |
| 5-HHB(F)—F | 13.0% |
| V-HHB(F)—F | 5.0% |
| 2-H2HB(F)—F | 6.0% |
| 3-H2HB(F)—F | 6.0% |
| 3-H2BB(F)—F | 5.0% |
| 3-HHEBH-5 | 3.0% |
| Tc = 83.7° C. | |
| TL < −20° C. | |
| Δn = 0.082 | |

-continued

```
η = 20.8 mPa · s
Vth = 1.72 V
θ0 = 5.1°
Example 9

5-HB—CL          5.0%
5-HH—V           6.0%
3-HBEB—F         5.0%
5-HBEB—F         4.0%
3-HHEB(F)—F     18.0%
3-HBEB(F)—F     10.0%
2-HHB(F)—F       9.0%
3-HHB(F)—F       9.0%
5-HHB(F)—F       9.0%
2-HBB(F)—F       8.0%
3-HBB(F)—F       4.0%
5-HBB(F)—F       8.0%
V-HHB-1          5.0%
Tc = 96.2° C.
TL < −20° C.
Δn = 0.095
θ0 = 5.8°
```

When 0.11 parts by weight of cm-33 based on 100 parts of the above composition was added, the physical properties are shown below:

Pitch=89.3 μm

η=18.8 mPa·s

Vth=1.78 V

INDUSTRIAL APPLICABILITY

The present invention has provided the liquid crystal compositions having especially broad nematic phase range, low viscosity, low threshold voltage and large pre-tilt angle, while meeting the general properties required for AM-LCD.

What is claimed is:

1. A liquid crystal composition which comprises Component I comprising at least one compound selected from the compounds of the formulas (I-1) to (I-3), Component II comprising at least one compound selected from the compounds of the formulas (II-1) to (II-4), Component III comprising at least one compound selected from the compounds of the formulas (III-1) and (III-2), and Component IV comprising at least one compound selected from the compounds of the formulas (IV-1) to (IV-3),

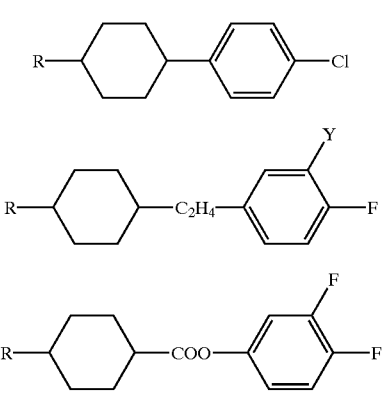

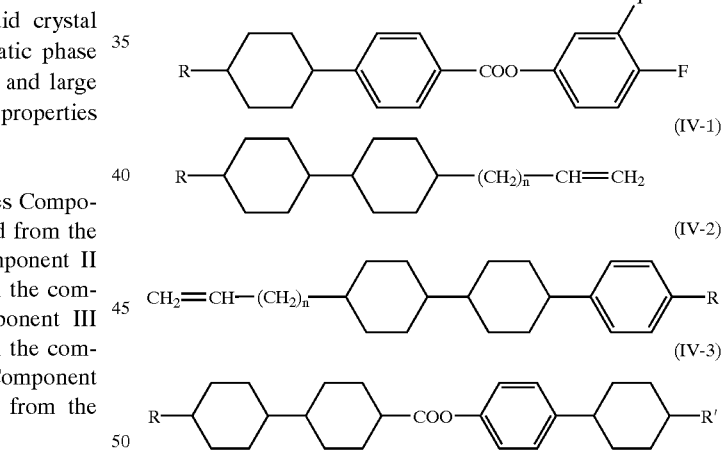

in which R and R' each independently represent an alkyl group of 2 to 7 carbon atoms, Y independently represents H or F, and n represents an integer of 0 to 4.

2. The liquid crystal composition as defined in claim 1, wherein Component I is the compound of the formula (I-1).

3. The liquid crystal composition as defined in claim 1, wherein Component I is the compound of the formula (I-2).

4. The liquid crystal composition as defined in claim 1, wherein Component I is the compound of the formula (I-3).

5. The liquid crystal composition as defined in claim 1, wherein the content of Component I is 5 to 30% by weight, the content of Component II is 30 to 70% by weight, the content of Component III is 5 to 45% by weight, and the content of Component IV is 5 to 30% by weight, based on the total weight of the composition.

6. A liquid crystal composition which consists essentially of four components of Component I comprising at least one compound selected from the compounds of the formulas (I-1) to (I-3), Component II comprising at least one compound selected from the compounds of the formulas (II-1) to (II-4), Component III comprising at least one compound selected from the compounds of the formulas (III-1) and (III-2), and Component IV comprising at least one compound selected from the compounds of the formulas (IV-1) to (IV-3),

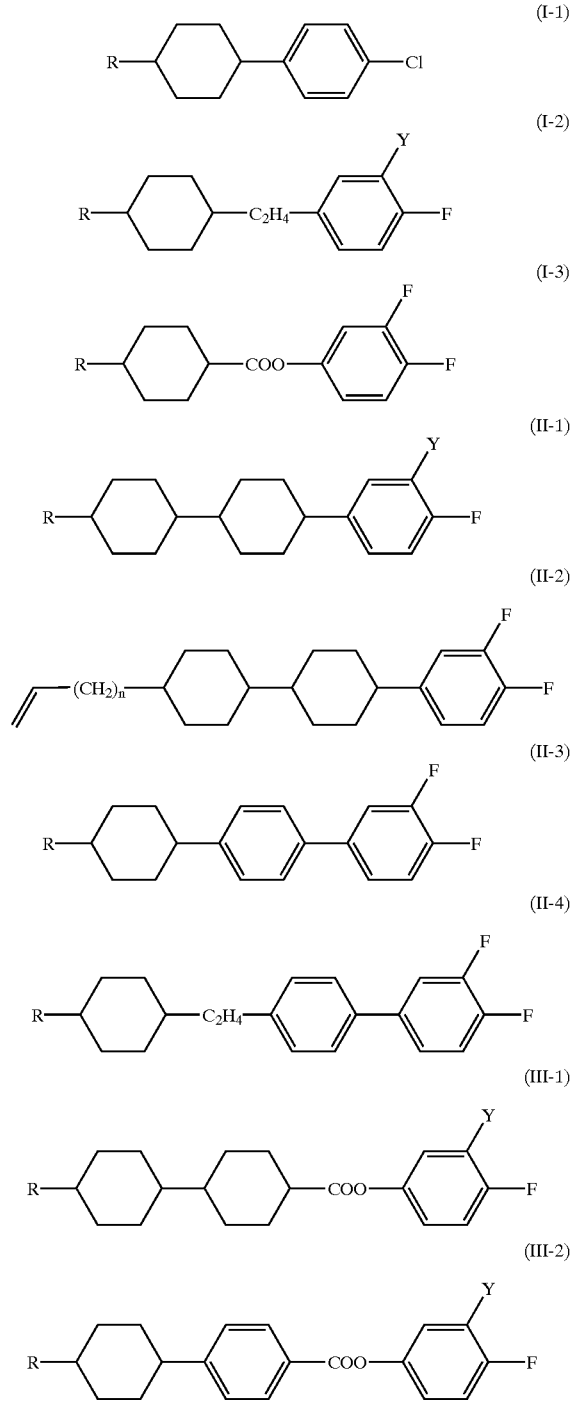

-continued

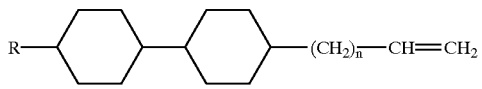
(IV-1)

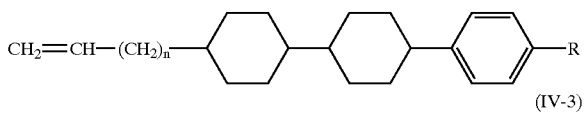
(IV-2)

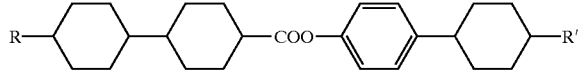
(IV-3)

in which R and R' each independently represent an alkyl group of 2 to 7 carbon atoms, Y independently represents H or F, and n represents an integer of 0 to 4.

7. The liquid crystal composition as defined in claim 6, wherein the content of Component I is 5 to 30% by weight, the content of Component II is 30 to 70% by weight, the content of Component III is 5 to 45% by weight, and the content of Component IV is 5 to 30% by weight, based on the total weight of the composition.

8. The liquid crystal composition as defined in claim 1, further containing Component V comprising at least one compound selected from the compounds of the formulas (V-1) and (V-2),

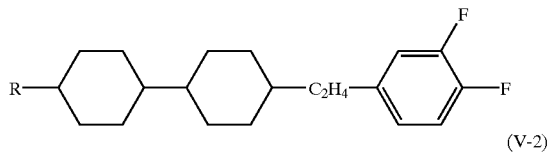
(V-1)

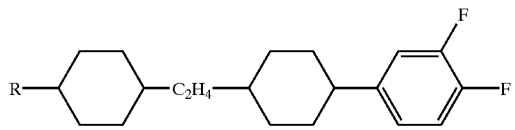
(V-2)

in which R independently represents an alkyl group of 2 to 7 carbon atoms.

9. The liquid crystal composition as defined in claim 8, wherein the content of Component I is 5 to 30% by weight, the content of Component II is 30 to 70% by weight, the content of Component III is 5 to 45% by weight, the content of Component IV is 5 to 30% by weight, and the content of Component V is 5 to 25% by weight, based on the total weight of the composition.

10. The liquid crystal composition as defined in claim 1, which further comprises 0.1 to 3% by weight of an optically active material, based on the total weight of the composition.

11. The liquid crystal composition as defined in claim 6, which further comprises 0.1 to 3% by weight of an optically active material, based on the total weight of the composition.

12. The liquid crystal composition as defined in claim 8, which further comprises 0.1 to 3% by weight of an optically active material, based on the total weight of the composition.

13. A liquid crystal display device which comprises the liquid crystal composition as defined in claim 1.

14. A liquid crystal display device which comprises the liquid crystal composition as defined in claim 6.

15. A liquid crystal display device which comprises the liquid crystal composition as defined in claim 8.

16. A liquid crystal display device which comprises the liquid crystal composition as defined in claim 10.

17. A liquid crystal display device which comprises the liquid crystal composition as defined in claim 11.

18. A liquid crystal display device which comprises the liquid crystal composition as defined in claim 12.

* * * * *